US009989948B2

(12) United States Patent
Ibrahim et al.

(10) Patent No.: US 9,989,948 B2
(45) Date of Patent: Jun. 5, 2018

(54) METHODS AND SYSTEMS FOR DYNAMIC MEMORY BACKUP FOR TRANSFER-SWITCH CONTROLLERS

(71) Applicants: Mario Ibrahim, Summit, NJ (US); Robert Siciliano, Boonton, NJ (US); John Hayes, Hardwick, NJ (US)

(72) Inventors: Mario Ibrahim, Summit, NJ (US); Robert Siciliano, Boonton, NJ (US); John Hayes, Hardwick, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 899 days.

(21) Appl. No.: 14/171,570

(22) Filed: Feb. 3, 2014

(65) Prior Publication Data

US 2014/0246910 A1 Sep. 4, 2014

Related U.S. Application Data

(60) Provisional application No. 61/766,872, filed on Feb. 20, 2013.

(51) Int. Cl.
*B23K 11/24* (2006.01)
*H02B 1/24* (2006.01)
(Continued)

(52) U.S. Cl.
CPC ............ *G05B 19/0428* (2013.01); *H02J 3/14* (2013.01); *H01H 2300/018* (2013.01); *Y10T 307/615* (2015.04)

(58) Field of Classification Search
CPC ....... H02J 3/14; H02J 3/00; H02J 4/00; G06F 12/00; G06F 12/10; G06F 1/26; G06F 11/30; G06F 1/30; H04W 52/04
(Continued)

(56) References Cited

U.S. PATENT DOCUMENTS 7,500,115 B2 * 3/2009 Berke .................... G06F 1/263
711/106
7,962,772 B2 * 6/2011 Jain ........................ H02J 9/062
713/300
(Continued)

OTHER PUBLICATIONS

English Translation of Chinese First Office Action for Chinese Patent Application No. 201420056821.2 dated May 16, 2014.

*Primary Examiner* — Rexford Barnie
*Assistant Examiner* — Jagdeep Dhillon
(74) *Attorney, Agent, or Firm* — McDonnell Boehnen Hulbert & Berghoff LLP

(57) ABSTRACT

Methods and systems for transfer-switch controller backup and transfer-switch controller operation are provided. An example backup apparatus includes a memory configured to store transfer-switch data related to a first transfer-switch controller, wherein the first transfer switch-controller is a controller for a given transfer switch. The apparatus is capable of interfacing with a communication interface of the first transfer-switch controller. The apparatus is further capable of being removed from the communication interface of the first transfer-switch controller and thereafter interfacing with a communication interface of a second transfer-switch controller, wherein the second transfer-switch controller is a replacement controller for the given transfer switch. The memory is further configured to, after the apparatus interfacing with the communication interface of the second transfer-switch controller, provide the transfer-switch data related to the first transfer-switch controller to the second transfer-switch controller.

22 Claims, 5 Drawing Sheets

(51) Int. Cl.
  *G05B 19/042* (2006.01)
  *H02J 3/14* (2006.01)

(58) Field of Classification Search
  USPC ........ 307/64, 112, 23, 31, 29; 711/154, 162,
  711/106; 713/340, 300; 700/297, 295;
  455/520, 523, 521
  See application file for complete search history.

(56) References Cited

U.S. PATENT DOCUMENTS

| | | | | |
|---|---|---|---|---|
| 8,301,833 B1* | 10/2012 | Chen | ................... | G06F 11/1441 710/10 |
| 9,128,130 B2* | 9/2015 | Seeley | ............... | G01R 19/2513 |
| 2004/0088393 A1* | 5/2004 | Bullen | ............... | H04L 41/0663 709/223 |
| 2005/0071092 A1* | 3/2005 | Farkas | ...................... | H02J 3/14 702/60 |
| 2007/0253124 A1* | 11/2007 | Zhou | ...................... | H01H 9/563 361/2 |
| 2008/0231118 A1* | 9/2008 | Roepke | ..................... | G06F 1/30 307/64 |
| 2010/0225167 A1* | 9/2010 | Stair | ......................... | H02J 3/14 307/29 |
| 2012/0079291 A1* | 3/2012 | Yang | ...................... | G06F 1/263 713/300 |
| 2013/0041519 A1* | 2/2013 | Feldstein | .................. | H02J 3/14 700/297 |
| 2013/0095877 A1* | 4/2013 | Smith | ...................... | H04Q 9/00 455/522 |
| 2015/0180280 A1* | 6/2015 | Frampton | ................. | H02J 3/48 307/53 |
| 2015/0180367 A1* | 6/2015 | Tesch | ...................... | H02M 7/493 363/95 |
| 2015/0214779 A1* | 7/2015 | Tomassi | ................. | H02J 9/061 307/65 |

* cited by examiner

METHODS AND SYSTEMS FOR DYNAMIC MEMORY BACKUP FOR TRANSFER-SWITCH CONTROLLERS

BACKGROUND

Unless otherwise indicated herein, the materials described in this section are not prior art to the claims in this application and are not admitted to be prior art by inclusion in this section.

A transfer switch is an electrical switch that reconnects an electric power source from its primary source to a standby source. A transfer switch may be manually or automatically operated. In an example, an automatic transfer switch may be installed where a backup generator is located, so that the generator may provide temporary electrical power if the utility source fails. Automatic transfer switches may utilize a transfer-switch controller for controlling various functions of the transfer-switch, such as sensing, timing, and control functions.

Transfer-switch life expectancy may exceed the life of the transfer-switch controller. For example, a transfer-switch controller may be replaced before the transfer switch itself needs to be replaced, and the transfer-switch controller may be replaced due to obsolete components, technology upgrades, or internal faults of the transfer-switch controller. Replacing a transfer-switch controller may result in a number of disadvantages, including but not limited to significant downtime of the transfer switch, loss of data, and errors in reconfiguration of the transfer switch and the new transfer-switch controller for the transfer switch.

SUMMARY

In one example aspect, a backup-memory apparatus for a transfer-switch controller is provided. The apparatus comprises a memory configured to store transfer-switch data related to a first transfer-switch controller, wherein the first transfer switch-controller is a controller for a given transfer switch. The apparatus is capable of interfacing or communicating with a communication interface of the first transfer-switch controller. The apparatus is further capable of being removed or disconnected from the communication interface of the first transfer-switch controller and thereafter interfacing with a communication interface of a second transfer-switch controller, wherein the second transfer-switch controller is a replacement controller for the given transfer switch. Further, the memory is configured to, after the apparatus interfaces with the communication interface of the second transfer-switch controller, provide at least a portion of the stored transfer-switch data related to the first transfer-switch controller to the second transfer-switch controller.

In another example, a backup-memory apparatus for a transfer-switch controller comprises (a) a communication interface configured to interface with a communication interface of a first transfer-switch controller, wherein the first transfer switch-controller is a controller for a given transfer switch; (b) a memory configured to store program instructions; and (c) a processor, wherein the processor is capable of executing the program instructions to (i) receive from the first transfer-switch controller transfer-switch data related to the first transfer-switch controller, and (ii) store the received transfer-switch data in the memory. Further, the communication interface is capable of being removed or disconnected from the communication interface of the first transfer-switch controller and thereafter interfacing with a communication interface of a second transfer-switch controller, wherein the second given transfer-switch controller is a replacement controller for the given transfer switch. Still further, the processor is capable of executing the program instructions to, after the communication interface interfaces with a communication interface of a second transfer-switch controller, provide at least a portion of the stored transfer-switch data related to the first transfer-switch controller to the second transfer-switch controller. In one preferred example, the memory apparatus may selectively provide at least a portion of the stored transfer switch data.

In still another example, a transfer-switch controller for a transfer switch is provided. The transfer-switch controller comprises: (a) a communication interface configured to receive or communicate with a memory device, wherein the memory device has stored information, wherein the stored information is transfer-switch data related to a first transfer-switch controller for the transfer switch; (b) a memory configured to store program instructions; and (c) a processor capable of executing the program instructions to: (i) receive at least a portion of the stored information from the memory device; (ii) use the stored information as a basis to select transfer-switch settings for the transfer-switch controller; and (iii) cause the transfer-switch controller to operate according the selected transfer-switch settings. In one preferred example, the memory apparatus may selectively provide at least a portion of the stored transfer switch data.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
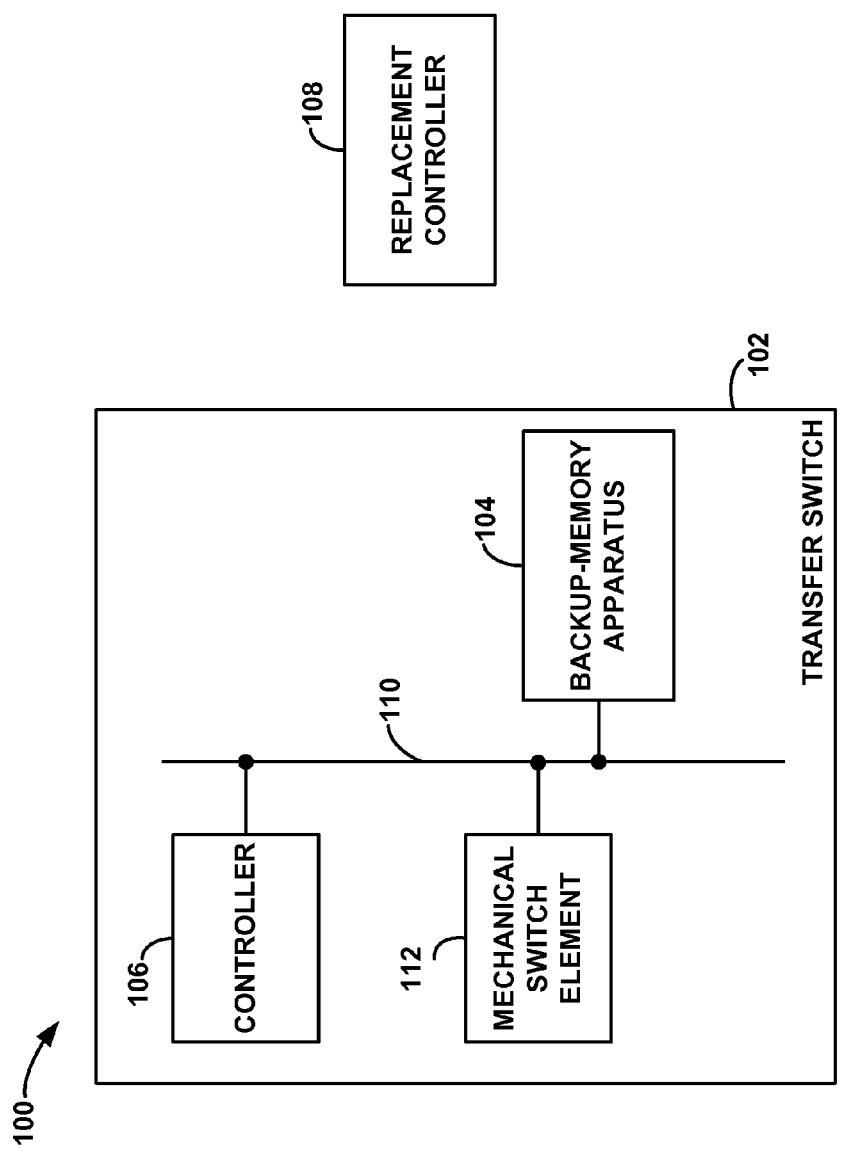
FIG. 1 is an illustration of an example transfer-switch system including a first transfer-switch controller and a second transfer-switch controller, according to an example embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

A transfer switch may utilize a transfer-switch controller for controlling certain operational features of the transfer switch. In particular, the transfer-switch controller may control various functions of the transfer switch, such as controlling sensing, timing, and control functions. For one reason or another, a transfer-switch controller for a given transfer switch may be replaced with another transfer-switch controller. For example, a transfer-switch controller may be replaced due to obsolete components, technology upgrades, or internal faults. In some situations, transfer-switch life expectancy may significantly exceed the life expectancy of the transfer-switch controller.

The process of replacing and/or upgrading a transfer-switch controller with another transfer-switch controller may involve or result in a number of disadvantages. For example, there may be lost transfer-switch data due to a fault, a partial or a complete failure of the transfer-switch controller. As another example, there may be a possibility of error when reconfiguring, programming, and/or set up the new or replacement transfer-switch controller. As yet another example, the replacement process may result in significant downtime due to the amount of time it takes to replace the transfer-switch controller and configure the proper operational features of the new transfer-switch controller. Such downtime may be undesirable for a number of reasons, including but not limited to safety concerns and cost reasons.

A transfer-switch controller may store a significant amount of data important or critical to the operation of the transfer switch. However, replacing the transfer-switch controller typically can cause a loss of data related to the transfer switch and/or the transfer-switch controller. In some examples, this data may be unique to the application of the particular transfer switch for which the transfer-switch controller operates. Example data that a transfer-switch controller may store includes operational settings for the transfer-switch controller, data and/or trend information related to historical performance of the given transfer switch, and/or data related to maintenance for the given transfer switch. Other data is possible as well. In some examples, there could be a significant amount (e.g., 10+ years of data) of data in the controller that could be potentially lost due to a transfer-switch controller replacement or upgrade.

Beneficially, maintaining such transfer-switch data from the original transfer-switch controller may facilitate improved methods for both replacement of the transfer-switch controller and configuration of the replacement transfer-switch controller. For instance, having this data and/or trend information related to the original transfer-switch controller may expedite the configuration process. This, in turn, may beneficially mitigate downtime due to the transfer-switch controller replacement and configuration process.

The methods and systems described herein can facilitate a transfer-switch controller replacement that beneficially maintains original data from the replaced, original transfer-switch controller. An example system may comprise a backup-memory apparatus for a transfer-switch controller that may act as a dynamic memory backup for the transfer-switch controller. In accordance with an example embodiment, a backup-memory apparatus for a transfer-switch controller may include a memory configured to store transfer-switch data related to a first transfer-switch controller, wherein the first transfer switch-controller is a controller for a given transfer switch. The apparatus may be capable of interfacing with a communication interface of the first transfer-switch controller. Such an interface may be a wired or wireless interface. Where the backup memory apparatus comprises a component of the first transfer switch, the memory apparatus may further be capable of being removed from the communication interface of the first transfer-switch controller and thereafter interfacing with a communication interface of a second transfer-switch controller, wherein the second transfer-switch controller is a replacement controller for the given transfer switch. Further, the memory may further be configured to, after the apparatus interfaces with the communication interface of the second transfer-switch controller, provide at least a portion of the transfer-switch data related to the first transfer-switch controller to the second transfer-switch controller.

The disclosed backup-memory apparatus may address the aforementioned problems by storing certain real-time and static data into a memory device embedded in the transfer-switch controller, and by allowing for instant transfer of data to a replacement transfer-switch controller. Storage of the real-time and/or static data may be continuous or non-continuous.

If the transfer-switch controller needs to be replaced or upgraded for any reason, a technician could simply remove the backup-memory apparatus from the original controller and insert the backup-memory apparatus into the new, replacement transfer-switch controller. Upon initial start up of the replacement transfer-switch controller, the replacement transfer-switch controller may (i.e., if configured to do so) then upload relevant operational data from the installed backup-memory apparatus. This disclosed process essentially allows the new, replacement transfer-switch controller to take over precisely or close to where the original transfer-switch controller left off. Thus, this method and system helps to ensure that all (or at least a portion of) possible data (precise moment prior to transfer-switch controller failure) is captured and then, if required, restored into the new transfer-switch controller.

Alternatively, if the transfer-switch controller needs to be replaced or upgraded for any reason, a technician could simply use a stand along backup-memory apparatus (such as a laptop, PDA, phone, or other communication device) and then use the backup-memory apparatus to establish a communication link with the new, replacement transfer-switch controller. Upon initial start up of the replacement transfer-switch controller, the replacement transfer-switch controller may then provide a prompt to the technician who can then respond to this prompt by selectively determining some or all of the stored data to upload. Once this selection is made, the relevant operational data may then be uploaded from the installed backup-memory apparatus.

In accordance with another example embodiment, a transfer-switch controller for a transfer switch may be provided. The controller may comprise (a) a communication interface configured to establish a communication link with a memory device, wherein the memory device has stored information, wherein the stored information is transfer-switch data related to a first transfer-switch controller for the transfer switch; (b) a memory configured to store program instructions; and (c) a processor capable of executing the program instructions to: (i) receive at least a portion of the stored information from the memory device; (ii) use the stored information as a basis to select transfer-switch settings for the transfer-switch controller; and (iii) cause the transfer-switch controller to operate according to the selected transfer-switch settings.

Example Transfer-Switch System

FIG. 1 is a simplified block diagram of a transfer-switch system in which the proposed methods and systems can be implemented. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a transfer-switch controller or backup-memory apparatus, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

The transfer-switch system 100 includes a transfer switch 102 that, for example, functions as a switch between its primary power source and a backup, standby power source. The transfer switch 102 includes a mechanical switching mechanism 112. The mechanical switching mechanism 112 may be configured to operate automatically or manually or a combination of automatic and manual operation. The switch mode of the mechanical switching mechanism 112 may be Open Transition (OT) or Closed Transition (CT).

The transfer switch 102 also includes a backup-memory apparatus 104 and a transfer-switch controller 106. The mechanical switching mechanism 112, the memory apparatus 104 and the switch controller 106 may be coupled together by a system bus or other mechanism 110. In one such alternative mechanism, a wireless data channel may be provided. System 100 also includes a replacement transfer-switch controller 108. The replacement transfer-switch controller 108 may comprise a component part of the transfer switch 102 or it may be a separate component part.

As mentioned above, for one reason or another, a transfer-switch controller for a given transfer switch (and not the mechanical switching mechanism 112) may need to be replaced with another transfer-switch controller. In this regard, transfer-switch controller 106 may be replaced by replacement transfer-switch controller 108. In an example, transfer-switch controller 106 may have obsolete components or failed components, leading to the need to replace the transfer-switch controller 106 with the replacement transfer-switch controller 108. As illustrated in FIG. 1, the backup memory apparatus may be a component part of the transfer switch 102. Alternatively, the backup memory apparatus may be a hand held communication device such as a lap top computer, a tablet, a cell phone, a PDA (Personal Digital Assistant) or other similar electronic device.

Figure 2:
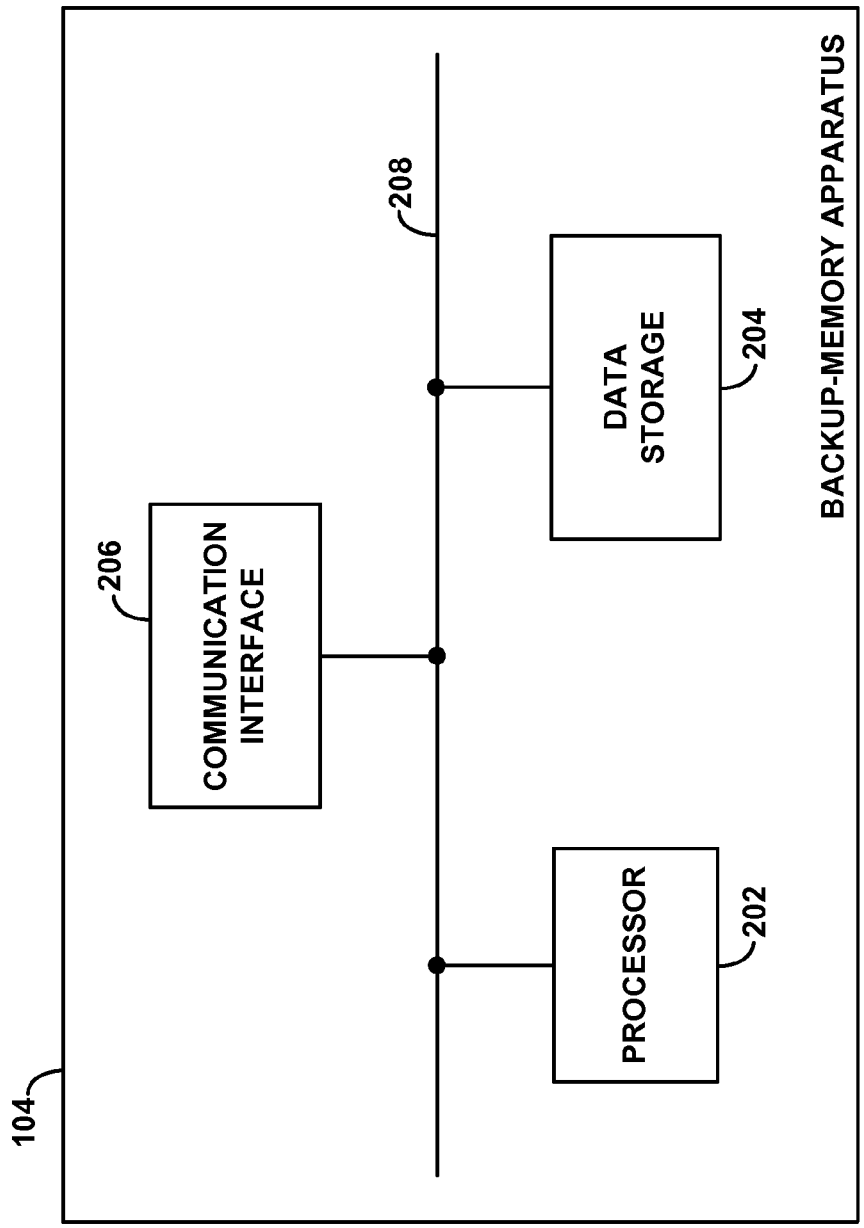
FIG. 2 is an illustration of an example backup-memory apparatus for a transfer-switch controller, according to an example embodiment of the present disclosure.

The backup-memory apparatus 104 may be configured to carry out various functions of the disclosed methods. FIG. 2 is a simplified block diagram of the backup-memory apparatus 104 showing some of the components that such a backup-memory apparatus 104 may include to facilitate implementation of the present methods. As shown in FIG. 2, the backup-memory apparatus 104 may include a processor 202, data storage 204, and communication interface 206, all of which may be coupled together by a system bus or other mechanism 208.

Each of these components of the backup-memory apparatus 104 may take various forms. For instance, processor 202 could be one or more general-purpose microprocessors and/or dedicated signal processors. Instruction and data storage 204 could be volatile (although not preferred) and/or nonvolatile memory, such as flash memory. The backup-memory apparatus 104 may communicate with entities of the transfer-switch system 100, such as transfer-switch controller 106. Instruction and data storage 204 holds a set of logic (e.g., computer instructions) executable by processor 202 to carry out the various backup-memory apparatus functions described herein and perhaps other functions. Instruction and data storage 204 may also have stored therein information related to the transfer-switch controller 106. In some embodiments, one or more of the backup-memory apparatus 104 functions can be carried out by firmware and/or hardware.

Figure 3:
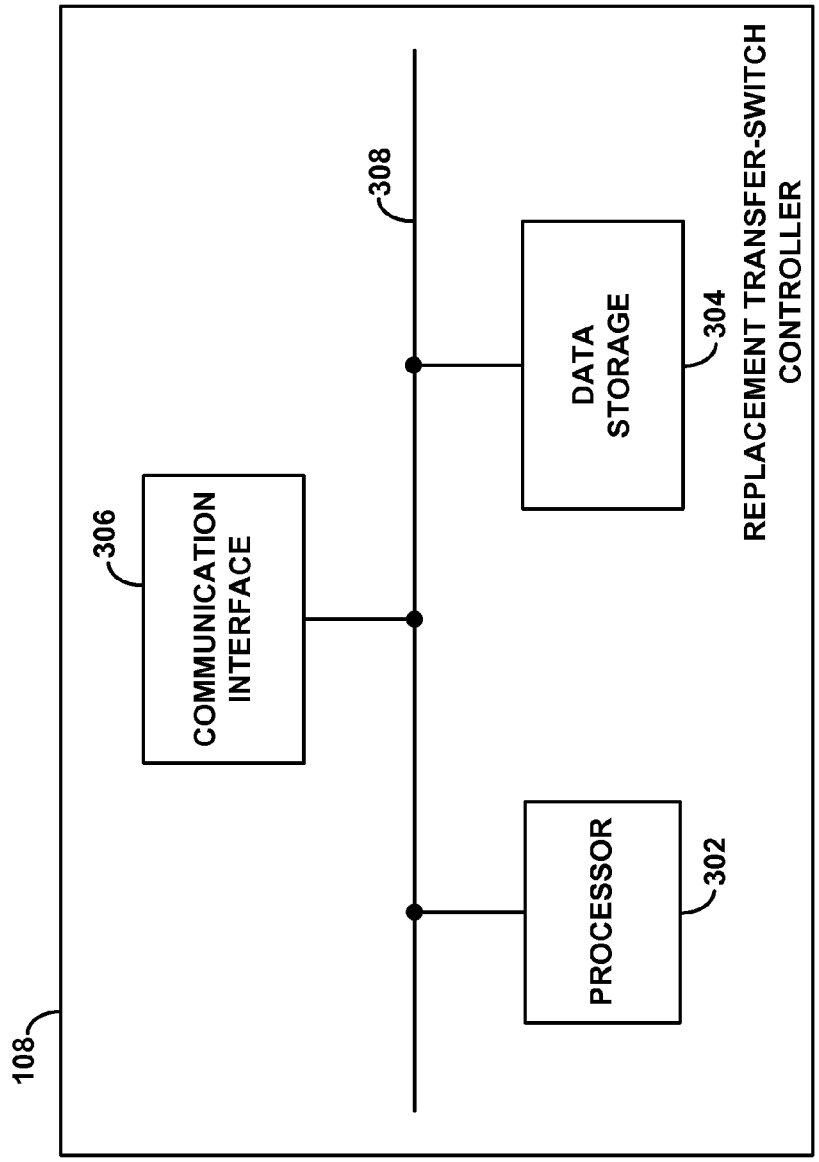
FIG. 3 is an illustration of an example transfer-switch controller, according to an example embodiment of the present disclosure.

Further, a transfer-switch controller, such as transfer-switch controller 106 or 108, may be configured to carry out various functions of the disclosed methods. FIG. 3 is a simplified block diagram of the transfer-switch controller 108 showing some of the components that such a transfer-switch controller may include to facilitate implementation of the present methods. As shown in FIG. 3, the transfer-switch controller 108 may include a processor 302, data storage 304, and communication interface 306, all of which may be coupled together by a system bus or other mechanism 308.

Each of these components of the transfer-switch controller 108 may take various forms. For instance, processor 302 could be one or more general-purpose microprocessors and/or dedicated signal processors. Instruction and data storage 304 could be volatile and/or nonvolatile memory, such as flash memory. The transfer-switch controller 108 may communicate with entities of the transfer-switch system 100, such as backup-memory apparatus 104. Instruction and data storage 304 holds a set of logic (e.g., computer instructions) executable by processor 302 to carry out the various backup-memory apparatus functions described herein and perhaps other functions. In some preferred examples, data storage 304 may also have stored therein information related to the first transfer-switch controller 106 or the backup-memory apparatus 104. In some embodiments, one or more of the transfer-switch controller 108 functions can be carried out by firmware and/or hardware.

Example Methods for a Backup-Memory Apparatus in a Transfer-Switch System

Figure 4:
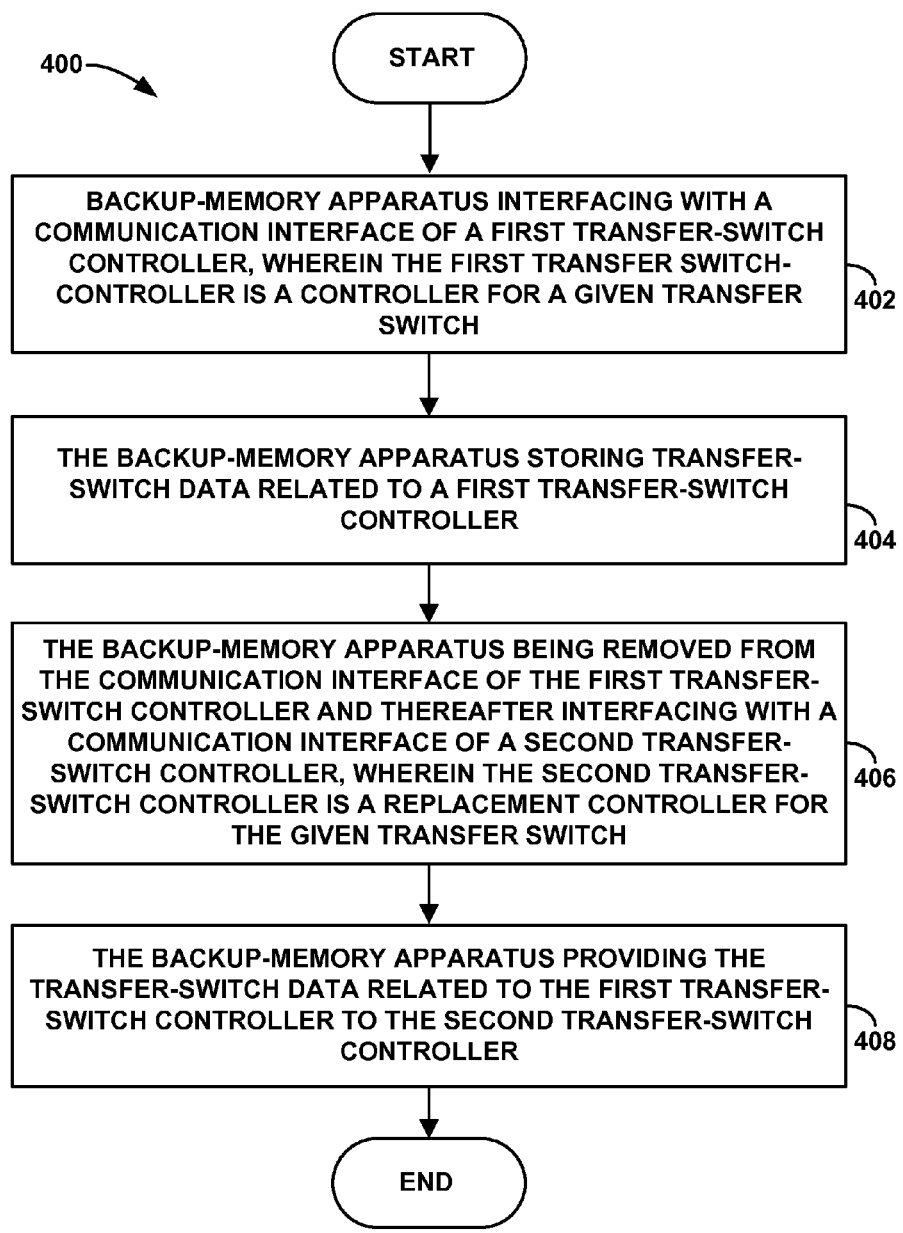
FIG. 4 is a flow chart illustrating an example method, according to an example embodiment of the present disclosure.

FIG. 4 is a flow chart depicting functions that can be carried out in the disclosed process in practice, in accordance with an example embodiment. The method 400 of FIG. 4 provides for backing up data related to a first transfer-switch controller and providing at least a portion of that data to a second (e.g., replacement) transfer-switch controller.

As shown in FIG. 4, at block 402, the method involves a backup-memory apparatus interfacing with or in communication with a communication interface of a first transfer-switch controller, wherein the first transfer switch-controller is a controller for a given transfer switch. This communication may take place over a hardwire communication link (such as the bus structure 110 illustrated in FIG. 1) or via a wireless communication link.

At block 404, the method then involves the backup-memory apparatus storing transfer-switch data related to the first transfer-switch controller. At block 406, the method involves the backup-memory apparatus being removed from the communication interface of the first transfer-switch controller. Thereafter, the back-up memory apparatus interfaces with a communication interface of a second transfer-switch controller, wherein the second transfer-switch controller is a replacement controller for the given transfer switch. After the apparatus interfaces with the communication interface of the second transfer-switch controller, the method involves, at block 408, the backup-memory apparatus being configured to provide the transfer-switch data related to the first transfer-switch controller to the second transfer-switch controller. The backup-memory apparatus may provide at least a portion or all of the data automatically or selectively.

Method 400 shown in FIG. 4 presents an embodiment of a method that could be carried out by backup-memory apparatus 104 of FIG. 1 or 2, or components of the backup-memory apparatus 104, for example. As another example, method 400 could be carried out by backup-memory apparatus 104 in conjunction with a transfer-switch controller, such as transfer-switch controller 106 or 108.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

In addition, for the method 400 and other processes and methods disclosed herein, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Returning to FIG. 4, at block 402, the backup-memory apparatus 104 may interface with a communication interface of a first transfer-switch controller. For instance, backup-memory apparatus 104 may interface with transfer switch-controller 106, which as shown in FIG. 1 is a transfer switch-controller for transfer switch 102.

In an example embodiment, the backup-memory apparatus 104 may have a communication interface, such as communication interface 206 shown in FIG. 2, and this communication interface 206 may be capable of interfacing with a corresponding communication interface of the first transfer-switch controller 106 and with a corresponding communication interface of the second transfer-switch controller 108. As discussed above, any suitable communication interface is possible, including but not limited to wired and/or wireless communication interfaces. As just one example, the communication interface may be configured for communication over the following different types of networks: Wi-Fi, a mobile VPN, a local area network, IEEE 802.11, a cellular data service such as GSM, CDMA, GPRS, 3G Networks such as W-CDMA, EDGE, or DCMA200, and/or Bluetooth.

In an example, the communication interface 206 may include a pluggable feature, such that the backup-memory apparatus may be unplugged from the first transfer-switch controller 106 and thereafter plugged into the second transfer-switch controller 108. The first transfer-switch controller 106 and the second transfer-switch controller 108 may each have a corresponding pluggable feature that corresponds to the pluggable feature of the backup-memory apparatus 104. In an example, the pluggable features may be any suitable electrical connector(s) that allow the backup-memory apparatus 104 to connect to the desired transfer-switch controller. Example electrical connectors include keyed connectors, terminal blocks, posts, plug-and-socket connectors, blade connectors, Universal Serial Bus (USB) connectors, and so forth. In addition to providing the required data pathway, the electrical connector may also comprise a power source so as to provide power to activate the device. Providing such power may be a user selectable feature on the back-up memory apparatus.

In an example, the backup-memory apparatus 104 includes an enclosure that is configured to house the memory and the communication interface of the apparatus. The backup-memory apparatus 104 may be enclosed in a housing and have a pluggable feature may facilitate easy removal from the first transfer-switch controller 106 and installation into the second transfer-switch controller 108. For instance, a technician may remove the backup-memory apparatus 104 from the first transfer-switch controller 106 by unplugging it, and the technician may then plug the backup-memory apparatus 104 into the replacement transfer-switch controller 108. In other words, the backup-memory apparatus may be a removable apparatus that can be moved between and connected to various transfer-switch controllers.

As known in the art, transfer-switch controllers can be configured to store a significant amount of critical data, including but not limited to: (1) communications settings, (2) software version number, (3) descriptive name, (4) descriptive location, (5) DIP switch settings, (6) various pick-up and drop-out setpoints, (7) enabled features, (8) various time delays, (9) transfer switch statistical data, (10) alarms, (11) certain operating conditions, and (12) transfer-switch events. This data may be critical to successful and reliable operation of the transfer switch. Further, as mentioned above, losing such data during transfer-switch controller replacement may be detrimental. In this regard, and returning to FIG. 4, the backup-memory apparatus 104 may, at block 404, store transfer-switch data related to the first transfer-switch controller 106. In general, the backup-memory apparatus 104 may backup any and/or all data that is stored by the first transfer-switch controller 106. Such transfer-switch data may include, for example, the transfer-switch data mentioned above. Other data is possible as well. For instance, data related to the first transfer-switch controller may include data representative of operational settings for the transfer-switch controller, data related to historical performance of the given transfer switch, and data related to maintenance data for the given transfer switch 102.

The backup-memory apparatus 104 may then, at block 406, be disconnected or removed from the communication interface of the first transfer-switch controller and thereafter interface with a communication interface of a second transfer-switch controller. This second transfer-switch controller may comprise a replacement controller for the given transfer switch, such as replacement transfer-switch controller 108. As mentioned above, this replacement may be brought upon for various reasons, such as obsolete controller components or controller failure.

After the backup-memory apparatus 104 interfacing with the communication interface 306 of the second transfer-switch controller, at block 408, the backup-memory apparatus 104 may provide the transfer-switch data related to the first transfer-switch controller 106 to the second transfer-switch controller 108.

Generally, the backup-memory apparatus 104 may provide the transfer-switch data related to the first transfer-switch controller 106 to the second transfer-switch controller 108 in any suitable fashion. In an example, the memory is configured to provide the transfer-switch data related to the first transfer-switch controller 106 to the second transfer-switch controller 108 after the apparatus 104 receives a command from the second transfer-switch controller 108 to provide the transfer-switch data. This data transfer may, for example, be manually prompted or may be automatic. For instance, when a technician is configuring the replacement transfer-switch controller 108, the technician may enter a command on the replacement transfer-switch controller 108 to initiate a partial or a complete data transfer of the transfer-switch data from the backup-memory apparatus 104.

In another example, the memory is configured to provide the transfer-switch data related to the first transfer-switch controller 106 to the second transfer-switch controller 108 in response to the backup-memory apparatus 104 interfacing with the communication interface 306 of the second transfer-switch controller 108. In an alternative arrangement, the second transfer-switch controller 108 may detect the backup memory apparatus 104 and provide a prompt allowing a user of the device to select either to download or not download stored data. Alternatively, the prompt may allow the user to select only certain stored data to be downloaded.

The replacement transfer-switch controller 108 may then use this received transfer-switch data for the operation of the replacement transfer-switch controller 108, and this process is described in greater detail below in the following section.

Methods for a Transfer-Switch Controller in a Transfer-Switch System

Figure 5:
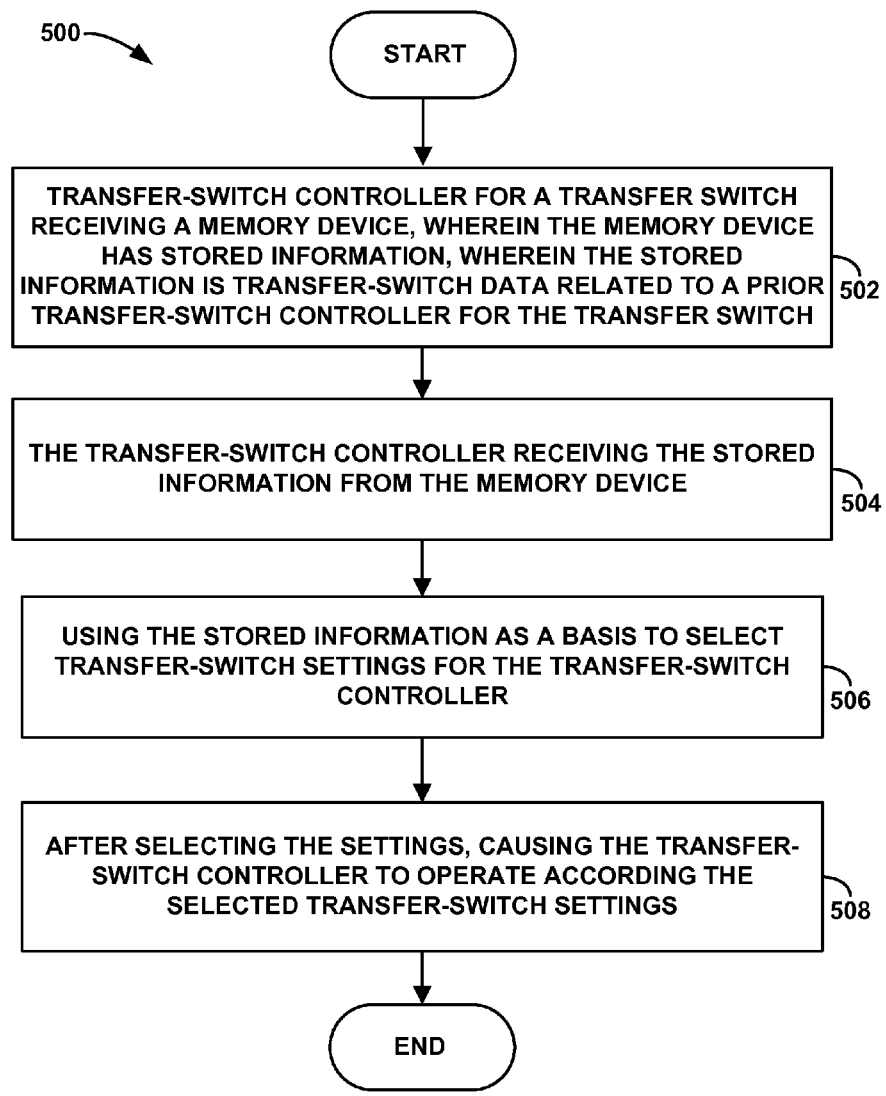
FIG. 5 is a flow chart illustrating another example method, according to an example embodiment of the present disclosure.

FIG. 5 is a flow chart depicting functions that can be carried out in the disclosed process in practice, in accordance with an example embodiment. The method 500 of FIG. 5 provides for a replacement transfer-switch controller for a given transfer switch receiving transfer-switch data related to a prior transfer-switch controller for that given transfer switch.

As shown in FIG. 5, at block 502, the method involves a transfer-switch controller for a transfer switch receiving a memory device, wherein the memory device has stored information, wherein the stored information is transfer-switch data related to a prior transfer-switch controller for the transfer switch. At block 504, the method then involves receiving the stored information from the memory device. At block 506, the method involves using the stored information as a basis to select transfer-switch settings for the transfer-switch controller. After selecting the settings, the method involves, at block 508, causing the transfer-switch controller to operate according the selected transfer-switch settings.

Method 500 shown in FIG. 5 presents an embodiment of a method that could be carried out by a transfer-switch controller such as replacement transfer-switch controller 108 of FIG. 3, or components of the transfer-switch controller 108, for example. It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

In addition, for the method 500 and other processes and methods disclosed herein, each block may represent circuitry that is wired and/or wireless so as to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Returning to FIG. 5, at block 502, the transfer-switch controller 108 may receive backup-memory apparatus 104. This memory device 104 has stored information including transfer-switch data related to a prior transfer-switch controller 106 for the transfer switch 102.

At block 504, the transfer-switch controller 108 may receive the stored information from the memory device 104. As mentioned above, this receiving may occur automatically (e.g., upon the memory device being plugged into the controller) or after the controller prompts the backup-memory apparatus 104 to provide the transfer-switch data (e.g., by a command input by a technician).

At block 506, the transfer-switch controller 108 may use the received stored information as a basis to select transfer-switch settings for the transfer-switch controller 108. For instance, the transfer-switch controller 108 may utilize the same settings that transfer-switch controller 106 utilized. In another example, the transfer-switch controller 108 may analyze that received transfer-switch data and select appropriate settings based on the analysis. These may be substantially the same settings, while having some differences. For example, if a particular setting led to a negative effect (e.g., a transfer-switch event or failed component), that particular setting may be adjusted in an appropriate manner, and the adjusted setting may be applied to the replacement transfer-switch controller 108.

Generally, the settings for a transfer-switch controller are tweaked or changed or customized to the specific application and/or installation over a period of time. For instance, default settings of a transfer-switch controller may be changed over a period of time based on the operation of the transfer switch. However, using the stored information may beneficially allow the replacement controller 108 to take over right where the original controller left off. The disclosed methods may help to ensure that certain desired data (e.g., data up to the precise moment before controller failure) is captured and restored to the new controller.

After selecting the settings, the transfer-switch controller 108 may cause the transfer-switch controller 108 to operate according the selected transfer-switch settings. As such, settings of the replacement transfer-switch controller have the benefit of data related to the transfer switch and replaced transfer-switch controller. This data may potentially include many years' worth of data related to the transfer switch and replaced transfer-switch controller, and the disclosed methods and systems ensure that this data is not lost.

In addition, after backup-memory apparatus 104 is connected to the replacement transfer-switch controller 108, the backup-memory apparatus 104 may continue to backup data related to the replacement transfer-switch controller 108. As such, the backup memory device may facilitate memory backup over the course of the entire life of the transfer switch 102, even if the transfer-switch controller for the transfer switch is replaced or upgraded one or more times.

Example Benefits of the Disclosed Methods and Systems

As described above, the proposed methods and systems beneficially provide an improved way for replacement of a transfer-switch controller and configuration of the replacement transfer-switch controller.

The disclosed methods and systems provide an improved way to maintain transfer-switch controller data and not lose such data due to the replacement of a transfer-switch controller. The backup-memory apparatus beneficially allows for saving this data even in an event where the transfer-switch controller has failed, either partially or completely, or simply needs to be replaced. Maintaining data related to a replaced transfer-switch may be beneficial for a variety of reasons. The transfer-switch controller may store data that the controller has collected over time, and this information may be critical to successful operation of the transfer switch. The transfer-switch controller may store data that provides maintenance personnel an idea of the entire duty cycle of the controller. For instance, the data may include information regarding the service data of the controller, time in service, number of cycles, when to clean the contacts of the transfer switch, etc. Further, the transfer-switch data may include event logs for the transfer switch. These event logs may be analyzed to adjust the settings for the transfer-switch controller. Settings for a transfer-switch controller are typically adjusted over a period of time, so that the controller settings are appropriate for the particular transfer switch for which the controller is used. If such data is lost, a new transfer-switch controller may need to undergo the process of collecting more data in order to adjust the new transfer-switch controller settings over time. However, by maintaining data related to a replaced transfer-switch, appropriate and reliable settings based on the saved transfer-switch data may be selected for the replacement transfer-switch controller at the time of replacement.

As another example benefit, as known in the art, errors may occur when reconfiguring the new replacement transfer-switch controller, and the disclosed methods and systems may beneficially limit or reduce errors when reconfiguring the replacement transfer-switch controller. If the settings of the controller are incorrect for a particular transfer switch, the components of the transfer switch and/or transfer-switch controller may be negatively affected. As a particular example, transfer-switch controllers may have an in-phase monitor, so as to monitor whether the starting motor is in phase. However, failure to enable this transfer switch controller startup characteristic could result in significant damage to the motor if the transfer-switch tried to start the motor at an incorrect phase resulting in significant damage to a costly large-scale motor. Other issues and errors when reconfiguring a transfer-switch controller are possible as well. Beneficially, using the disclosed backup-memory apparatus for a transfer-switch controller will help to minimize or limit potential reconfiguration errors.

As yet another example benefit, controller replacement and configuration may be both a labor intensive and time consuming process, and the disclosed methods and systems may reduce or limit the amount of labor and time required for controller replacement and configuration. For controller replacement, maintenance technicians typically need to move in and out of the transfer-switch area during the replacement process. This replacement process may be both difficult and time consuming. As is known in the art, various safety measures must be taken during transfer-switch controller replacement. These safety measures may be time consuming, and may also add to the downtime of the transfer switch. For example, given the potential high-voltage conditions in the transfer-switch area, maintenance technicians typically need to wear high-voltage protective suits. As technicians may need to be in and out during maintenance, this may require many rounds of changing in and out of these high-voltage protective suits, which may be time consuming and inconvenient. Therefore, minimizing the time required for controller replacement may be beneficial. The disclosed system and methods may beneficially speed up the controller replacement process, thereby decreasing the downtime of the transfer switch.

In another example, if the transfer-switch panel fails, there may be a need to replace the entire panel. This may result in potential arc flash issues. The disclosed methods and systems may limit the time required for transfer-switch controller replacement and configuration, thus reducing or limiting potential arc flash issues.

For these reasons and the reasons described throughout the disclosure, the disclosed methods and systems can help improve the transfer-switch controller replacement process and the replacement transfer-switch controller configuration process. This may in turn lead to improved and reliable operation of the transfer switch with the replacement controller.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A backup-memory apparatus for a transfer-switch controller, the apparatus comprising:
   a memory configured to store transfer-switch data related to a first transfer-switch controller, wherein the first transfer switch-controller comprises a controller for a given transfer switch, and wherein the transfer-switch data includes data related to historical performance of the given transfer switch and data related to an in-phase monitor for monitoring a phase of a starting motor for the given transfer switch;

the apparatus capable of interfacing with a communication interface of the first transfer-switch controller;

the apparatus further capable of being disconnected from the communication interface of the first transfer-switch controller and thereafter interfacing with a communication interface of a second transfer-switch controller; and the memory further configured to, after the apparatus interfaces with the communication interface of the second transfer-switch controller, provide at least a portion of the transfer-switch data related to the first transfer-switch controller to the second transfer-switch controller for use by the second transfer-switch controller for startup of the starting motor in-phase.

2. The apparatus of claim 1, further comprising a communication interface of the apparatus, wherein the communication interface of the apparatus is capable of interfacing with the communication interface of the first transfer-switch controller and with the communication interface of the second transfer-switch controller.

3. The apparatus of claim 2, further comprising an enclosure that is configured to house the memory and the communication interface of the apparatus.

4. The apparatus of claim 1, wherein the memory further is configured to provide the transfer-switch data related to the first transfer-switch controller to the second transfer-switch controller after the apparatus receives a command from the second transfer-switch controller to provide the transfer-switch data.

5. The apparatus of claim 1, wherein the memory is configured to provide the transfer-switch data related to the first transfer-switch controller to the second transfer-switch controller in response to the apparatus interfacing with the communication interface of the second transfer-switch controller.

6. The apparatus of claim 1, wherein the transfer-switch data related to the first transfer-switch controller comprises data representative of operational settings for the first transfer-switch controller.

7. The apparatus of claim 1, wherein after the apparatus interfaces with the communication interface of the second transfer-switch controller, at least a selected portion of the transfer-switch data related to the first transfer-switch controller is provided to the second transfer-switch controller.

8. The apparatus of claim 1, wherein the communication interface of the first transfer-switch controller comprises a wireless communication interface.

9. The apparatus of claim 1, wherein the communication interface of the first transfer-switch controller comprises a pluggable feature.

10. A backup-memory apparatus for a transfer-switch controller, the apparatus comprising:

a communication interface configured to interface with a communication interface of a first transfer-switch controller, wherein the first transfer switch-controller is a controller for a given transfer switch;

a memory configured to store program instructions; and a processor, wherein the processor is capable of executing the program instructions to (i) receive from the first transfer-switch controller transfer-switch data related to the first transfer-switch controller, and (ii) store the received transfer-switch data in the memory, wherein the transfer-switch data includes data related to historical performance of the given transfer switch and data related to an in-phase monitor for monitoring a phase of a starting motor for the given transfer switch;

wherein the communication interface is capable of being removed from the communication interface of the first transfer-switch controller and thereafter interfacing with a communication interface of a second transfer-switch controller, wherein the second given transfer-switch controller is a replacement controller for the given transfer switch; and wherein the processor is further capable of executing the program instructions to, after the communication interface interfacing with a communication interface of a second transfer-switch controller, provide the transfer-switch data related to the first transfer-switch controller to the second transfer-switch controller for use by the second transfer-switch controller for startup of the starting motor in-phase.

11. The apparatus of claim 10, further comprising an enclosure that is configured to house the memory, the processor, and the communication interface.

12. The apparatus of claim 10, wherein the transfer-switch data related to the first transfer-switch controller comprises data representative of operational settings for the first transfer-switch controller.

13. The apparatus of claim 10, wherein the transfer-switch data related to the first transfer-switch controller comprises data related to maintenance data for the given transfer switch.

14. The apparatus of claim 10, wherein the communication interface of the first transfer-switch controller comprises a pluggable feature.

15. A transfer-switch controller for a transfer switch, wherein the transfer-switch controller comprises:

a communication interface configured to receive a memory device, wherein the memory device has stored information, wherein the stored information is transfer-switch data related to a first transfer-switch controller for the transfer switch, and wherein the transfer-switch data includes data related to historical performance of the transfer switch and data related to an in-phase monitor for monitoring a phase of a starting motor for the transfer switch;

a memory configured to store program instructions; and a processor capable of executing the program instructions to:

(i) receive the stored information from the memory device;

(ii) use the received stored information as a basis to select transfer-switch settings for the transfer-switch controller for use in the transfer switch; and (iii) cause the transfer-switch controller to operate according to the selected transfer-switch settings for startup of the starting motor in-phase.

16. The transfer-switch controller of claim 15, wherein causing the controller to operate according the selected transfer-switch settings comprises changing default settings of the transfer-switch controller to the selected transfer-switch settings.

17. The transfer-switch controller of claim 15, wherein the selected transfer-switch settings are the same as transfer-switch settings according to which the first transfer-switch controller operated.

18. The transfer-switch controller of claim 15, wherein the selected transfer-switch settings are substantially the same as transfer-switch settings according to which the first transfer-switch controller operated.

19. The transfer-switch controller of claim 15, wherein the transfer-switch data related to the first transfer-switch controller for the transfer switch comprises data representative of operational settings for the first transfer-switch controller.

20. The transfer-switch controller of claim 15, wherein the transfer-switch data related to the first transfer-switch controller for the transfer switch comprises data related to maintenance data for the transfer switch.

21. The transfer-switch controller of claim 15, wherein the communication interface configured to receive a memory device is a pluggable feature.

22. The back-up memory apparatus of claim 1 wherein the second transfer-switch controller comprises a replacement controller for the given transfer switch.

* * * * *